May 22, 1934.　　　G. S. FULCHER　　　1,960,147
INSULATOR AND METHOD OF TREATING IT
Filed May 7, 1930
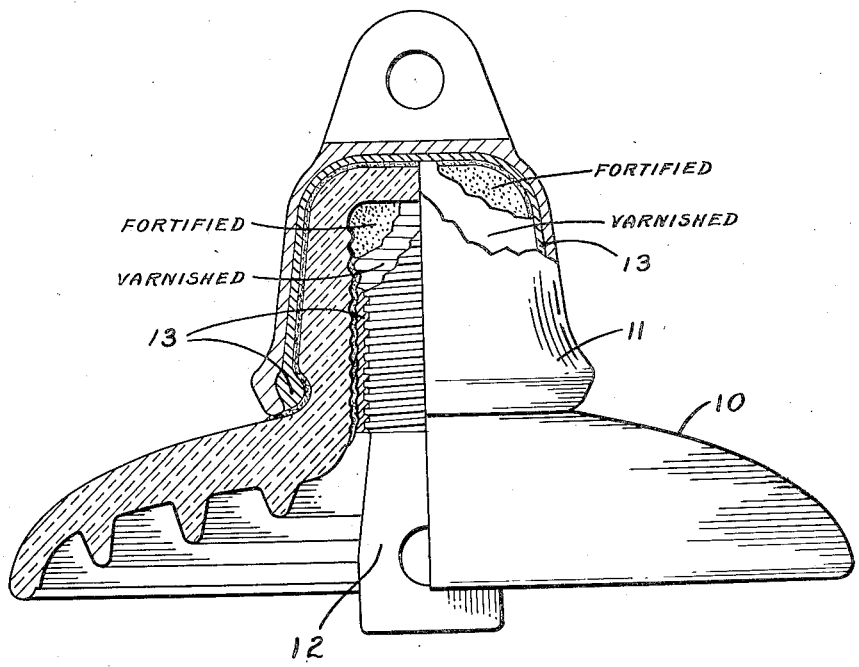
INVENTOR.
GORDON S. FULCHER
BY Dorsey & Cole
ATTORNEYS.

Patented May 22, 1934

1,960,147

UNITED STATES PATENT OFFICE 1,960,147

INSULATOR AND METHOD OF TREATING IT

Gordon S. Fulcher, Corning, N. Y., assignor to Corning Glass Works, Corning, N. Y., a corporation of New York Application May 7, 1930, Serial No. 450,600

6 Claims. (Cl. 173—318)

This invention relates to insulators and more particularly to suspension type insulators made from glass.

Heretofore much difficulty has been experienced in the production of suspension insulators from glass due to the difficulty of obtaining the desired tensile strength. It has been known for some time that by fortifying glass articles, that is by treating the surface of the articles to remove microscopic surface checks, their strength can be decidedly improved. The underlying theory is that the minute surface checks or irregularities formed in the glass during cooling provide crevices, which when any part of the article is placed under tension, become enlarged and so cause breakage under a much lower applied force than if the surface were perfectly smooth. By fortifying, i. e. acid treating the article to remove these minute surface checks and provide a perfectly smooth surface, the breaking strength of the articles can be increased to several times the breaking strength of the unfortified articles having the same dimensions.

This principle was applied to suspension type glass insulators each of which consisted of a glass shell with a pin fastened inside of the head and a cap fastened on the outside of the head, employing a metal alloy to cement the hardware on to the glass. However, the assembled insulators were found not to be as uniform in strength as expected. Experiments with fortified glass rods showed that heating them to a temperature approximating that of the molten alloy used for alloying hardware to glass insulators caused a weakening of the rods so that they broke under loads below those at which fortified but unheated rods would break. I have discovered, however, that if fortified rods are painted with a high temperature varnish they can be heated without affecting their strength. Applying this discovery to glass insulators I found that if I coated the freshly fortified glass surfaces with such a varnish before heating and then alloyed the hardware in place, the minimum strength of such insulators was 22,400 pounds, whereas for fortified but unvarnished insulators to which the hardware was alloyed the minimum strength was 17,000 pounds. In contrast to the fortified varnished and fortified unvarnished insulators above referred to, I found that for unfortified insulators the minimum strength was 9,000 pounds. I also discovered that fortified and varnished insulators will withstand steady loads of 10,000 pounds more consistently than fortified and unvarnished insulators and that their performance is more consistent under sudden temperature changes, alternate heating from 4° C. to 70° C. and chilling 70° C. to 4° C. It is therefore concluded that the varnish protects the fortified glass surface from checking due to the application of heat during assembly and also protects it against mechanical injury through accidental abrasion which is apt to occur while assembling the hardware on the glass part.

The object of the present invention is to prevent loss of strength of fortified suspension-type glass insulators during their assembly.

Another object is to prevent injury to the fortified surfaces of the glass insulating body during the assembling of the hardware thereon.

Among its features the invention embodies the covering of surfaces of glass insulators which have been fortified with a protecting coat of heat resistant substance such as a heat resisting varnish.

The accompanying drawing represents the preferred embodiment of my invention and illustrates a completely assembled suspension type insulator partly in section with a portion of the metal cap and pin broken away to show the head and pinhole fortified and coated with heat resistant varnish in accordance with my invention.

In the drawing a glass insulator shell 10, which has been acid fortified and whose head and pinhole have thereafter been coated with a heat resistant varnish, has a metal cap 11 and pin 12 attached to its head and pinhole respectively by means of a layer of alloy 13.

In carrying my invention into practice I first fortify the surfaces of the low expansion borosilicate glass body 10 to which the metal fittings are to be attached by immersing them in an etching solution consisting of one part hydrofluoric acid and one part sulphuric acid for a period of fifteen minutes. After removing the glass shell 10 from the acid it is washed and allowed to dry and the treated surfaces are then coated with a heat resistant varnish which consists of a mixture of paranol resin and China-wood oil which may be purchased in the market under the name of Ault and Wiborg No. 1222. I then heat the glass shell 10 to about 130° C. and spray the surface with "aquadag" which consists of a colloidal suspension of graphite in water. After the spraying operation the glass shell 10, together with the metallic parts 11 and 12, is heated to approximately 280° C. and the alloy which consists preferably of 87% lead and 13% antimony is heated to a temperature of 330° C., at which it will freely flow. The alloy is then poured into the space between the insulator and the hardware to form the layer of alloy 13 and allowed to cool, with the result that a secure bond between the glass and metal parts is obtained.

By "fortifying" as herein used, I mean the rounding out of crevices so as to leave no sharp angles at which a crack may commence.

What I claim is:—

1. The method of attaching metal fittings to glass insulators which includes fortifying a surface of the glass and coating it with a heat resistant substance.

2. The method of attaching metal fittings to glass insulators which includes fortifying predetermined surfaces of the glass and coating them with a heat and abrasive resistant varnish.

3. The method of attaching metal fittings to glass insulators which includes fortifying those portions of the glass which contact with metal fittings and coating the fortified parts with a heat and abrasive resistant substance.

4. A glass insulator having a portion fortified and coated with a heat and abrasive resistant substance.

5. A glass insulator having its metal contact portions fortified and coated with a heat resistant varnish.

6. A glass insulator having fortified surfaces for contact with metal fittings and a heat and abrasive resistant coating on said surfaces.

GORDON S. FULCHER.